(12) United States Patent
Hurd

(10) Patent No.: US 8,054,388 B2
(45) Date of Patent: Nov. 8, 2011

(54) UNSEEN FLAT SCREEN

(76) Inventor: Daniel S. Hurd, Blacksburg, VA (US)

( * ) Notice: Subject to any disclaimer, the term of this patent is extended or adjusted under 35 U.S.C. 154(b) by 1365 days.

(21) Appl. No.: 11/065,451

(22) Filed: Feb. 25, 2005

(65) Prior Publication Data

US 2006/0192901 A1    Aug. 31, 2006

(51) Int. Cl.
*H04N 5/645* (2006.01)
(52) U.S. Cl. ..... 348/825; 348/827; 348/837; 297/217.3; 297/217.7; 248/183.1; 248/205.5; 248/276.1; 248/284.1; 248/292.14; 248/453; 248/278.1; 248/286.1
(58) Field of Classification Search .......... 348/825, 348/827, 837; 297/217.3, 217.7; 248/183.1, 248/205.5, 276.1, 278.1, 284.1, 286.1, 292.14, 248/453
See application file for complete search history.

(56) References Cited

U.S. PATENT DOCUMENTS

| | | | | |
|---|---|---|---|---|
| 1,862,237 A | * | 6/1932 | Pepler | 108/49 |
| 2,709,818 A | * | 6/1955 | Freese | 5/507.1 |
| 3,717,375 A | * | 2/1973 | Slobodan | 297/162 |
| 4,410,158 A | | 10/1983 | Maffei | |
| 4,516,751 A | | 5/1985 | Westbrook | |
| 4,780,919 A | * | 11/1988 | Harrison | 5/600 |
| 5,007,608 A | | 4/1991 | Carroll, Jr. | |
| 5,009,379 A | | 4/1991 | Sadler | |
| 5,035,464 A | * | 7/1991 | Spallholtz | 297/144 |
| 5,177,616 A | * | 1/1993 | Riday | 348/837 |
| 5,179,447 A | | 1/1993 | Lain | |
| 5,207,405 A | | 5/1993 | Cobb | |
| 5,540,159 A | | 7/1996 | Anderson | |
| 5,634,622 A | | 6/1997 | Pye | |
| 6,104,443 A | | 8/2000 | Adcock | |
| 6,149,253 A | | 11/2000 | Talasani | |
| 6,213,438 B1 | | 4/2001 | Ostby et al. | |
| 6,375,259 B1 | | 4/2002 | Ma | |
| 6,581,887 B2 | | 6/2003 | Lapidez | |
| 6,769,657 B1 | | 8/2004 | Huang | |
| 7,410,138 B2 | * | 8/2008 | Parsons | 248/278.1 |

* cited by examiner

*Primary Examiner* — Jay Patel
*Assistant Examiner* — James Pontius

(57) ABSTRACT

A support apparatus is provided for supporting a television or other video display for movement between a viewing position and a storage position. The support apparatus is attached to the frame of an article of furniture such as a bed. The support apparatus may allow the video display to rotate from a vertical, viewing position to a horizontal position in which the video display can be retracted beneath the article of furniture for storage. The movement of the support apparatus may be manual or automatic.

19 Claims, 8 Drawing Sheets

UNSEEN FLAT SCREEN

FIELD OF THE INVENTION

Embodiments of the invention relate to support apparatus for video display units. More particularly, embodiments of the invention relate to support apparatuses for attaching a flat screen television to a bed frame such that the television can be stored beneath the bed when not in use.

DESCRIPTION OF RELATED ART

Video displays of various types are used extensively. Traditionally, these displays have been heavy and bulky requiring inconvenient accommodation by users. Because of their large screen size and near ubiquity, televisions often require costly, unsightly and cumbersome carts, cabinets or mounting apparatus. Televisions can reduce the amount of useable space in a room and be unsightly and distracting when not in use.

Because of these problems, it may also be difficult to arrange a television in the most advantageous position for viewing. This is particularly true for users wishing to view television while sitting or laying in bed. The smaller size of bedrooms as compared to other rooms in the house may make it more difficult to position the television in an appropriate place, and the space available for a television may be more limited. In addition, beds are typically not as easy to arrange to accommodate a television as other furniture may be.

Accordingly attempts have been made to position televisions in relation to beds using a number of support structures. U.S. Pat. No. 4,410,158 describes an over-bed television support frame in which a television is supported by a frame for viewing from a prone position. The frame is supported by a headboard of the bed. U.S. Pat. No. 5,540,159 discloses a television stand in which a planar surface is supported on a hollow shaft attached to a bed. U.S. Pat. No. 6,104,443 describes a positioning system for small, compact, lightweight televisions which allows a user to position a television at a variety of angles in a variety of positions. These support structures may increase flexibility in positioning a television, however, they do not reduce the intrusiveness of the television.

Recent innovations in televisions have resulted in flat screen displays. These new televisions include such technologies as LCD or plasma screens and are much lighter and thinner than traditional televisions. The reduced bulk and weight of these new displays has decreased their intrusiveness. However, these televisions still require the use of shelf, floor or wall space. Additionally, a cabinet or cart is required if the user desires to hide the television when it is not in use.

In addition to new technology reducing the size and weight of televisions, recent advancements have allowed for the transmission of television signals without the use of wires. A transmitter may be attached to a cable or satellite receiver, DVD player, or any other video source. The transmitter then sends the display signal wirelessly to a remote television unit. Accordingly, televisions no longer need to be positioned close to video sources nor do they require wires to be run from the video source to the television.

The description herein of disadvantages and deleterious results achieved with known methods and devices is in no way intended to limit the scope of the embodiments described herein to their exclusion. Indeed, various aspects of the invention may include one or more known methods and devices without suffering from the inconveniences or disadvantages.

SUMMARY OF THE INVENTION

There remains a need in the art for an improved video display support apparatus. More specifically, there remains a need for a video display support apparatus capable of unobtrusively storing a television when not in use.

Therefore, it is a feature of an embodiment of the present invention to provide for an apparatus that may support a video display for movement between a viewing position and a storage position. The support apparatus is attached to the frame of an article of furniture. In a preferred embodiment that article of furniture may be a bed. The support apparatus has a support arm that extends horizontally from the bed frame. A second support arm is attached to the first support arm and extends vertically when the television is positioned for viewing. The second support arm is rotated to a horizontal position in order to move the video display to a storage position. In an embodiment of the invention, the second support arm may telescope to increase its compactness.

In an embodiment of the invention, the support arms of the apparatus may be attached to a cross member that is connected with tracks attached to the bed frame. The video display may be positioned for viewing at the foot of the bed. When the video display is moved to a storage position, the telescoping arm is retracted, the display is rotated from a vertical to a horizontal position, and the apparatus is slid along the tracks so that it is disposed beneath the bed.

In a further embodiment of the invention, the horizontal support member may be attached to the bed frame with the video display positioned for viewing along the side of the bed. When the video display is moved to a storage position, the telescoping arm is retracted, the display is rotated from a vertical to a horizontal position, and the apparatus is rotated beneath the bed from the side.

DESCRIPTION OF THE PREFERRED EMBODIMENTS

Figure 1:
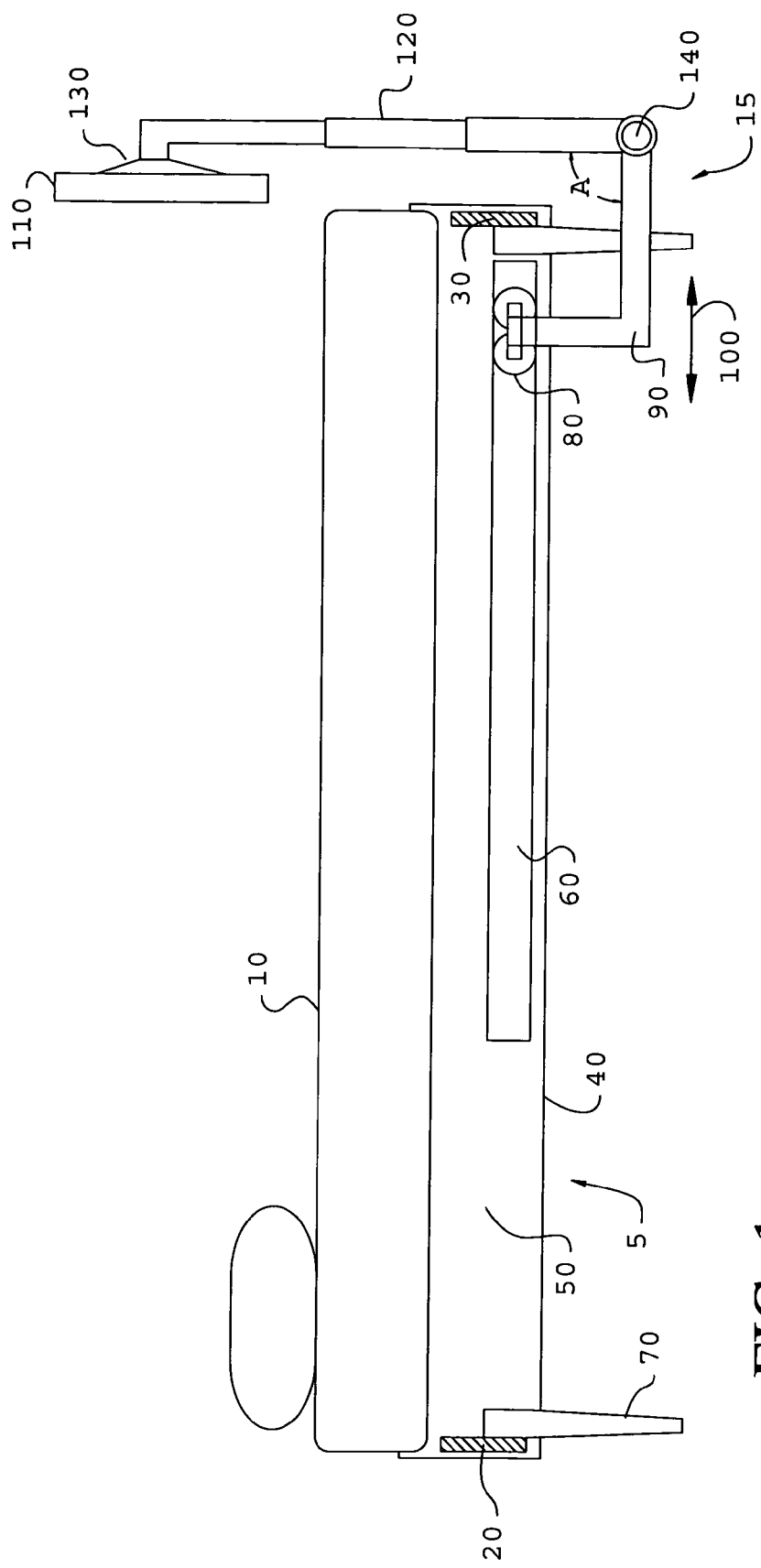
FIG. 1 is a side view of an embodiment of the present invention. The side board and legs have been removed from one side of the bed to more clearly show the embodiment of the invention.

The following description is intended to convey a thorough understanding of the embodiments by providing a number of specific embodiments and details involving a television support. It is understood, however, that the invention is not limited to these specific embodiments and details, which are exemplary only. It is further understood that one possessing ordinary skill in the art, in light of known device, systems and methods, would appreciate the use of the invention for its intended purposes and benefits in any number of alternative embodiments.

Throughout this description, the expression "television" refers to any video display device including, but not limited to, televisions, computer monitors, video game displays, or their equivalents. Additionally, reference may be made to "flat screen televisions." This terminology is intended to refer to video displays commonly known as "flat screen" or "flat panel" displays. Such displays may use technology referred to as LCD or plasma. However, nothing in this description should be interpreted to limit the embodiments to "flat screen," "flat panel," "LCD," or "plasma" televisions or displays. Embodiments of the present invention encompass the use of any display such that the dimensions and characteristics of the display are appropriate for use with embodiments of the invention.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a television" includes a plurality of televisions, as well as a single television, and a reference to "a support arm" is a reference to one or more arms and equivalents thereof known to those skilled in the art, and so forth.

An embodiment of the present invention addresses the need to unobtrusively store a television while not in use by supporting a flat screen television for movement between a viewing position and a storage position beneath a bed. For viewing, the television is supported above the foot of the bed such that the television screen is visible to a user sitting or laying in the bed. When the television is in the viewing position, a horizontal support arm extends from under the foot of the bed. The horizontal arm is attached to a vertical arm that supports the television and elevates the television to a convenient viewing height. The vertical arm may be telescopic. The television is rotatable with respect to the vertical arm so that the viewing angle may be adjusted to accommodate various users.

When the television is not in use, it may be stored beneath the bed. In order to store the television, the telescoping vertical support is retracted, the television and support are rotated from a vertical to a horizontal orientation, and the television is slid under the bed. In this way, the television may be easily and unobtrusively stored when not in use. This embodiment of the invention is described in more detail below with reference to FIGS. 1-3.

Referring to FIG. 1, an embodiment of a television support 15 is shown in an extended position for viewing television 110. A bed frame 5 supports a mattress 10. The bed frame has a head frame rail 20, a foot frame rail 30, and side boards 40. Legs 70 support the bed frame 5 above a floor. Each side board has an exterior surface and an interior surface 50. In the figure, the legs and side board of the near side have been removed to more clearly illustrate the embodiment. A track 60 is attached to the interior surface 50 of side board 40. Rollers 80 ride within the track 60. A T-arm 90 is mounted to the rollers 80 in such a manner that the T-arm 90 transverses horizontally as shown by arrow 100. Any number of known track and roller combinations may be used.

Television 110 is attached to telescoping arm 120. The telescoping arm is shown in an extended position. A joint 130 attaching the television to the telescoping arm may allow the television to rotate in a vertical and/or horizontal plain with reference to the telescoping arm so that the viewing angle of the television can be adjusted. A rotating joint 140 connects the T-arm 90 with the telescoping arm 120. In the viewing position, angle A is approximately 90 degrees.

Figure 2:
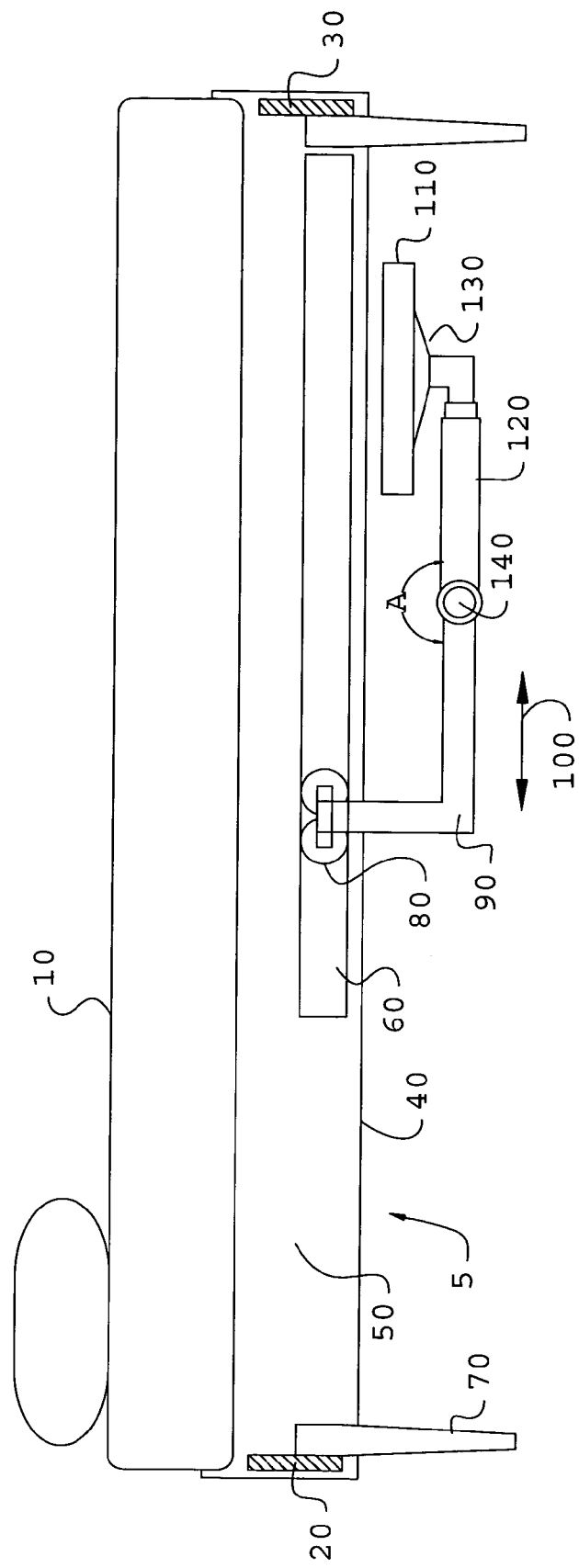
FIG. 2 is a side view of the embodiment of FIG. 1 in a retracted position.

FIG. 2 shows the embodiment of FIG. 1 in a retracted position appropriate for storing television 110 when not in use. In moving the television support from a viewing position to a storage position, telescoping arm 120 is moved from an extended position to a retracted position. Joint 140 is rotated so that angle A is approximately 180 degrees, and the television support apparatus 15 is traversed horizontally along track 60 until the television 110 is disposed beneath the bed.

Figure 3:
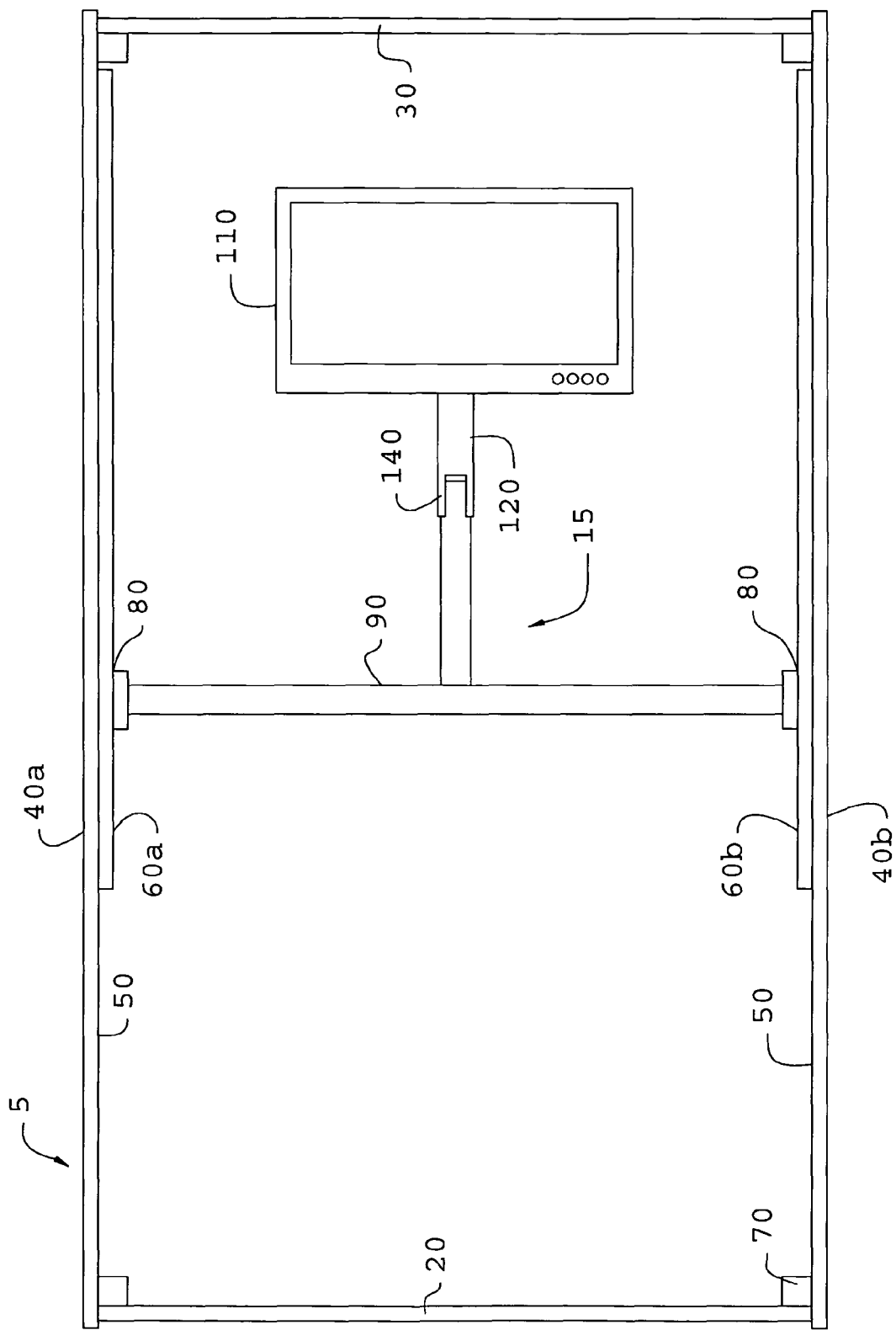
FIG. 3 is a view of the embodiment of FIG. 1 in a retracted position as seen from above the bed. The mattress has been removed from the bed to more clearly show the embodiment of the invention.

FIG. 3 shows an above-the-bed view of an embodiment of the television support 15 in a storage position. The mattress 10 has been removed so that the embodiment may be more clearly shown. T-arm 90 may extend across the width of the bed frame 5 connecting at a first and a second end with rollers 80. The rollers ride in tracks 60a and 60b each attached to the interior surface 50 of side boards 40a and 40b respectively. In addition, television 110 may have a dust cover (not shown) designed to protect the television while in a stored position and removable when the television is moved to a viewing position.

In another embodiment, the need to effectively store a television is addressed while providing an added benefit of conveniently positioning the television for viewing by an individual user. In this embodiment, the television may be attached to an extension arm that extends horizontally to one side of the television. The extension arm is attached to a vertical support arm that may be telescopic. The television may be rotatable with respect to the vertical arm so that the television may be positioned at the optimal viewing angle. The vertical arm is attached to a horizontal support arm that extends from beneath the side of the bed. In this way the television may be positioned close to a user and specifically within the view of a user occupying one side of the bed.

In order to store the television, the television and extension arm are rotated 90 degrees. The telescoping arm is retracted and rotated so that the television and telescoping arm are horizontal. The support structure is rotated beneath the bed thereby unobtrusively storing the television when not in use. Additionally, the horizontal arm may be attached to the bed frame using a track so that the television can be slidably positioned either closer or farther from the user according to each user's preference. This embodiment of the invention is described more thoroughly below with respect to FIGS. 4-6.

Figure 4:
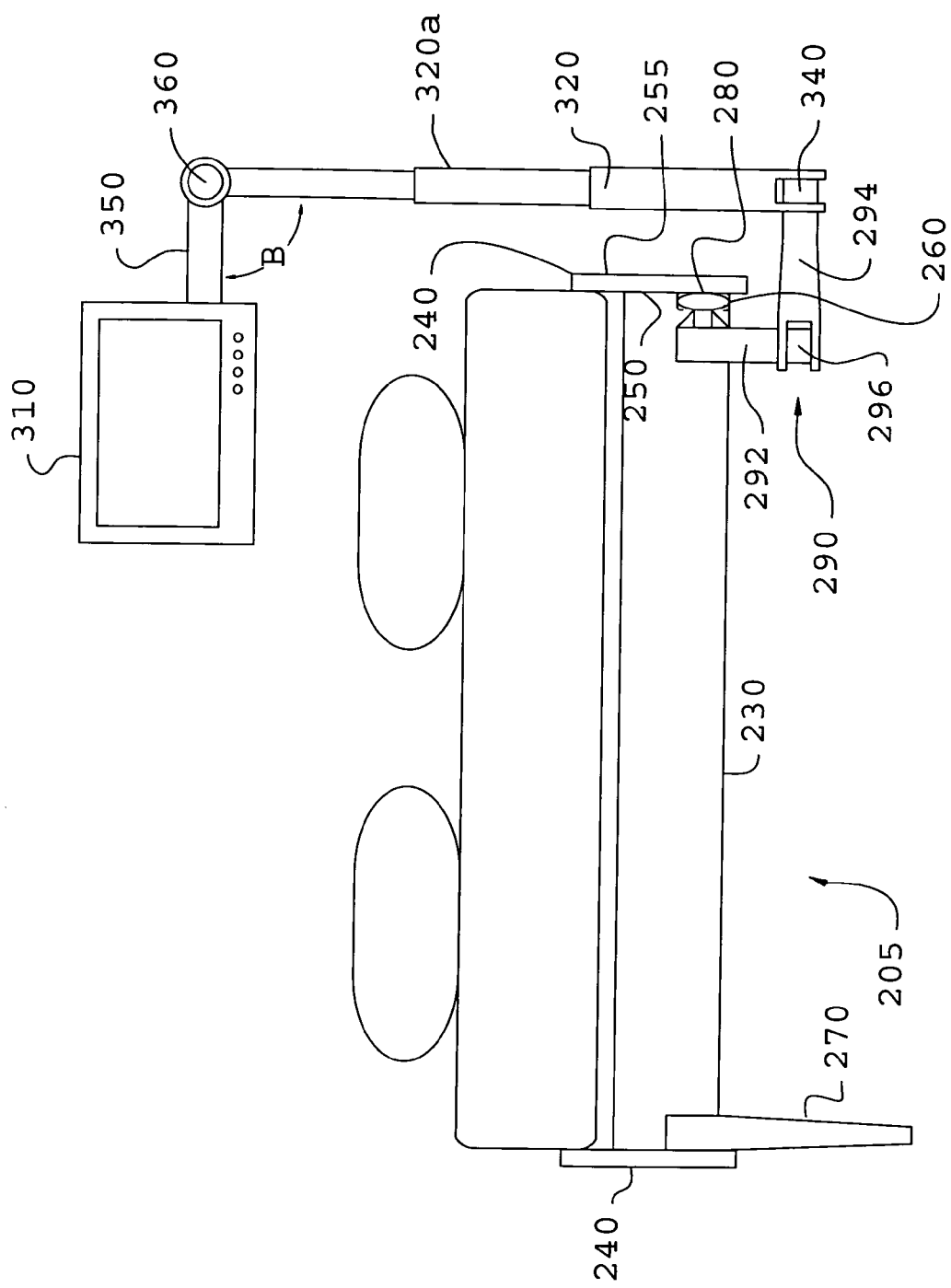
FIG. 4 is a view of another embodiment of the present invention as seen from the top of the bed. Portions of the bed frame and legs have been removed for ease of illustration.

With reference to FIG. 4, an embodiment of a television support 215 is shown in an extended position suitable for viewing television 310. A bed frame 205 has a foot frame rail 230, a head frame rail (not shown), and side rails 240. Side rails 240 have an interior surface 250 and an exterior surface 255. The frame 205 is supported above a floor by legs 270. Legs 270 have been deleted on one side to better illustrate the embodiment. A track 260 may be mounted to the interior surface 250 of side board 240. Rollers 280 travel within track 260. An L-arm 290 is connected to rollers 280 so that the L-arm traverses in conjunction with the rollers. The L-arm 290 has a vertical portion 292 and a horizontal portion 294. The horizontal portion 294 is attached to the vertical portion 292 by means of a joint 296 such that the horizontal arm rotates in a horizontal plane about an axis of the vertical portion.

A television 310 is connected to an extension arm 350 by means of a joint (not shown) which may allow the television to rotate in a vertical and/or horizontal plain with reference to the extension arm so that the viewing angle of the television can be adjusted. The extension arm 350 is connected with one end of a telescoping arm 320, shown in FIG. 4 in an extended position 320a, by a joint 360. The joint 360 allows the extension arm 350 to rotate relative to the telescoping arm 320 in a plain substantially parallel to the television 310. The telescoping arm is connected at an opposite end to the horizontal portion 294 of L-arm 290 by a joint 340. The joint 340 allows the telescoping arm to rotate around from a substantially vertical position to a substantially horizontal position around an axis of the horizontal portion 294 of the L-arm 290.

Figure 5:
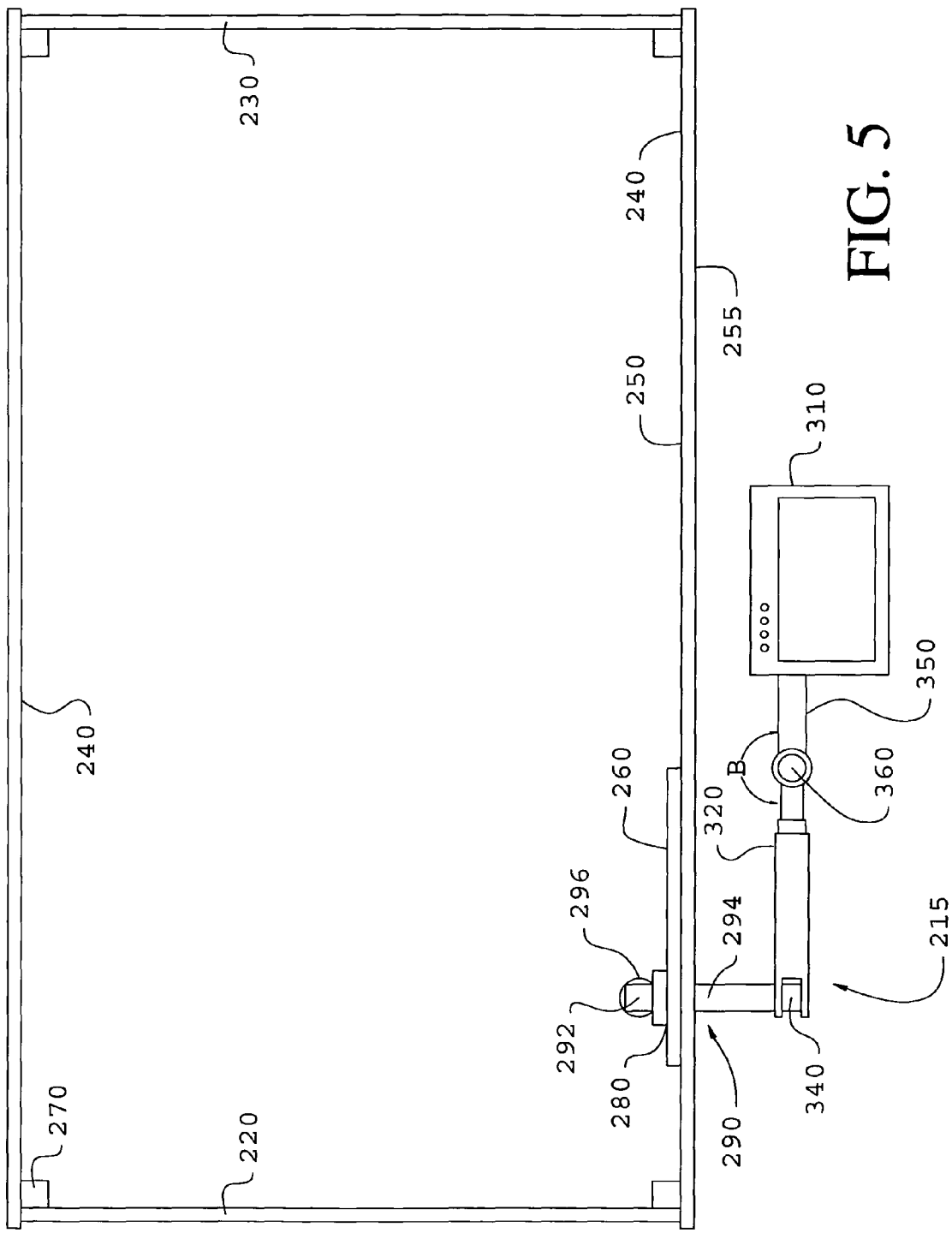
FIG. 5 is a view of the embodiment of FIG. 4 in a partially retracted position as seen from above the bed. The mattress has been removed from the bed to more clearly show the embodiment of the invention.

FIG. 5 shows the television support 215 in a partially retracted position. Joint 360 is rotated such that angle B is approximately 180 degrees and extension arm 350 is parallel to telescoping arm 320. Telescoping arm 320 is retracted, and joint 340 is rotated so that telescoping arm 320 moves from a vertical to a horizontal position.

Figure 6:
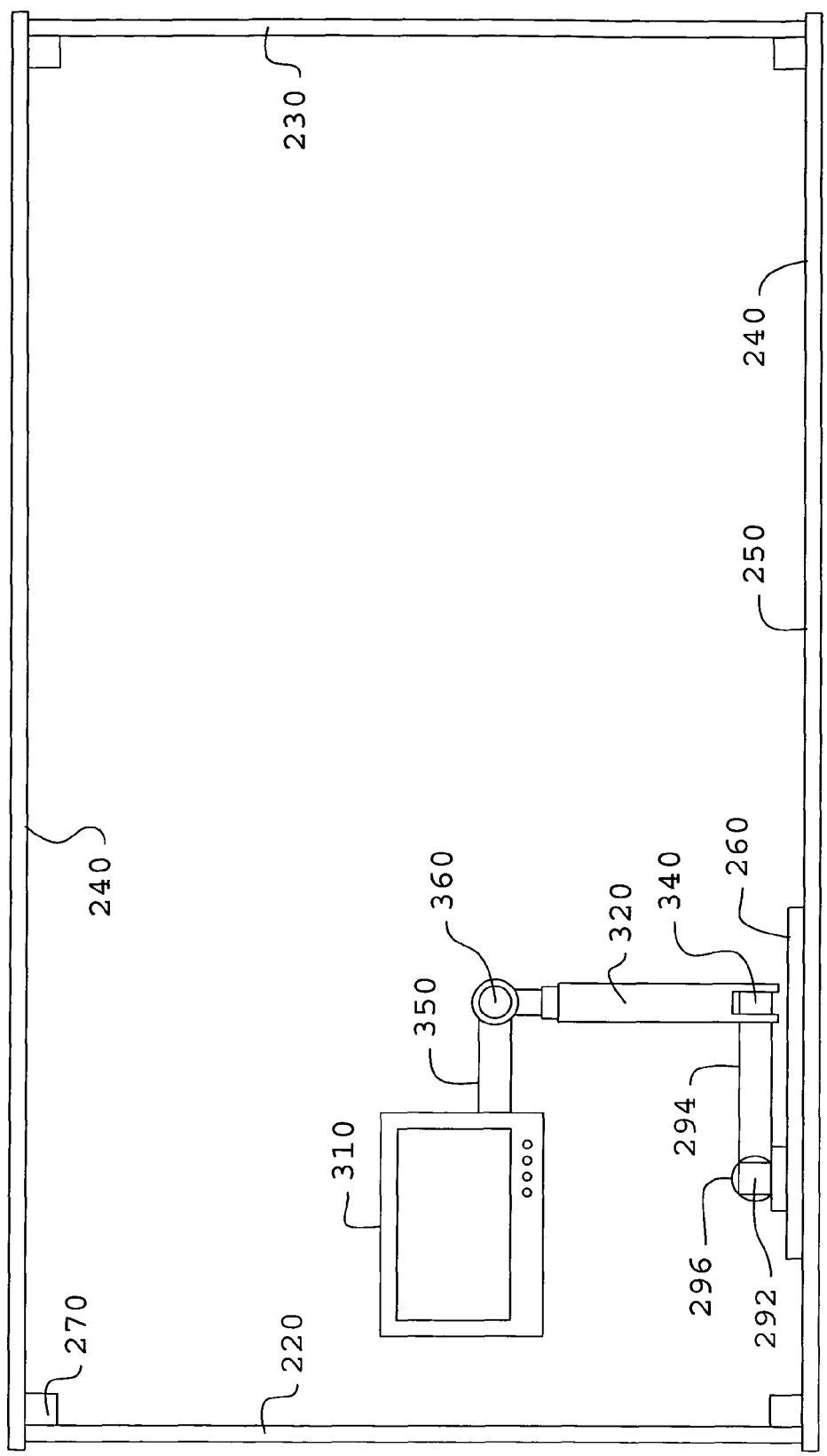
FIG. 6 is a view of the embodiment of FIG. 5 in a fully retracted position.

FIG. 6 shows the television support 215 in a completely retracted position suitable for storing the television 310 while not in use. Joint 296 is rotated such that the television support is moved beneath the bed. In addition, television 310 may have a dust cover (not shown) designed to protect the television while in a stored position and removable when the television is moved to a viewing position.

Figure 7:
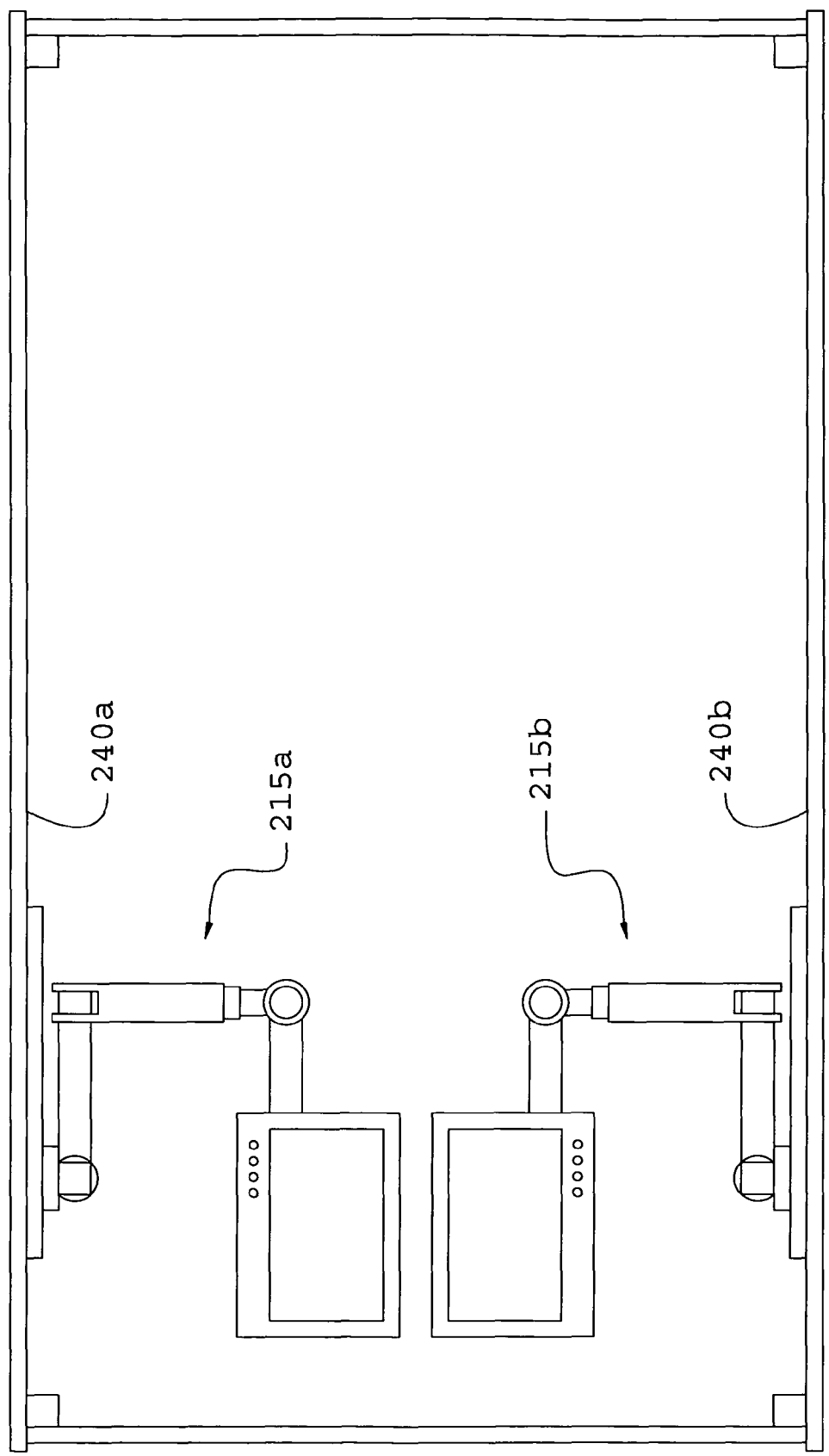
FIG. 7 is a view of an embodiment of the present invention, as seen from above the bed, in which two separate television supports are mounted to opposite side boards of the same bed.
Figure 8:
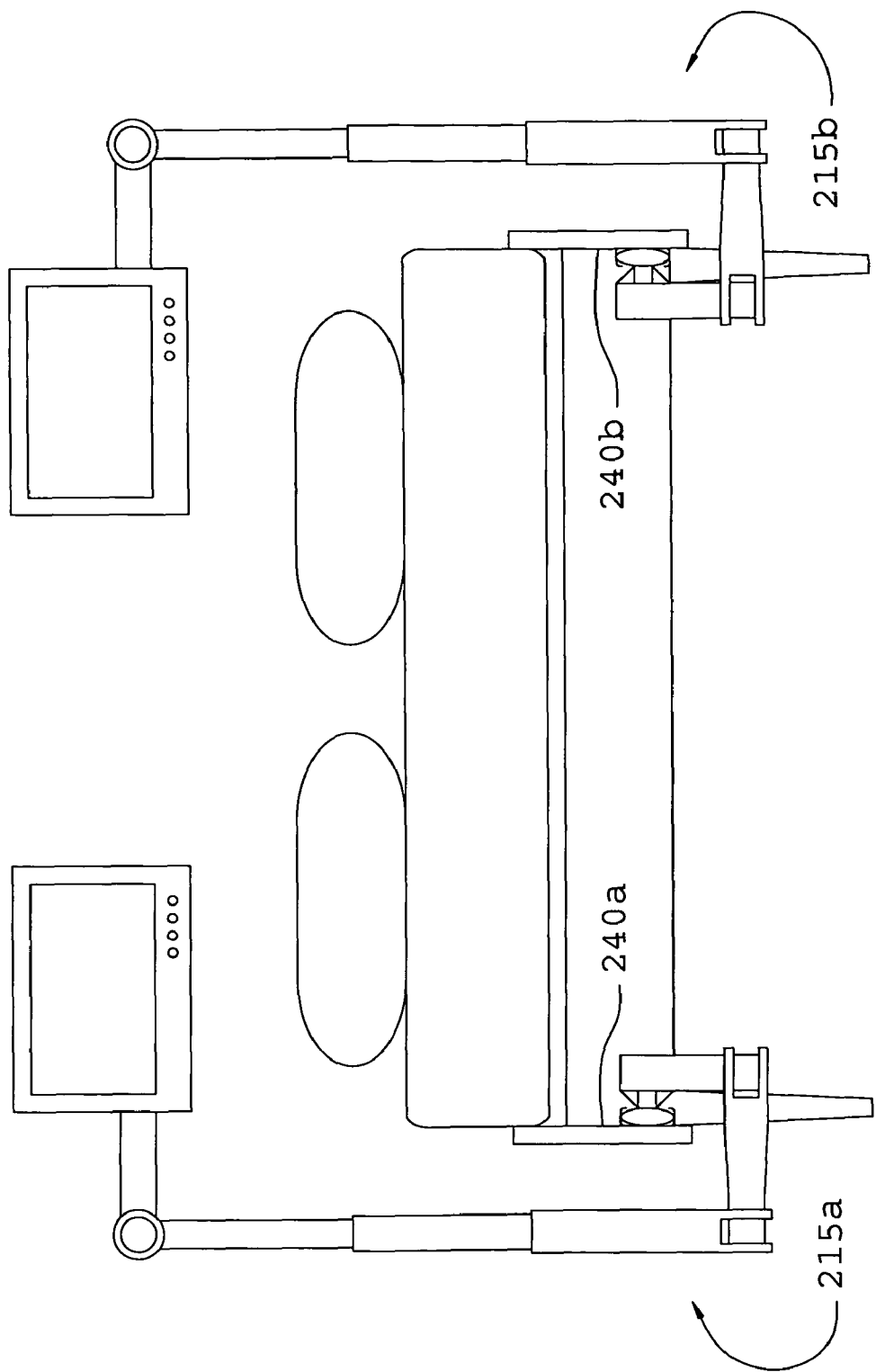
FIG. 8 is a view of the embodiment of FIG. 7 in a storage position as seen from the top of the bed.

In a further embodiment, a television and support structure may be mounted to each side of a bed. Referring to FIGS. 7 and 8, two individual television supports 215a, b may be mounted to side boards 240a, b. Thereby, two separate users may watch video derived from one or more separate video sources simultaneously. Each television and television support may be controlled independently.

Embodiments of the invention provide for a variety of possible configurations based on requirements of cost and convenience. In an embodiment of the invention, the television support is manually articulated by the user when moving between a stored position and a viewing position. In another embodiment, the television support is motorized such that it moves automatically between a stored position and a viewing position. In a further embodiment, the movement of the television support is motorized and initiated by a remote control device that additionally may be incorporated into a television remote control such that the support extends when the television is turned on and retracts when the television is turned off.

Possible locations of a television enabled by embodiments of the present invention may make it inconvenient to route cables extending between the television and video signal or power sources. Therefore, in an embodiment of the invention, the television may be battery powered, and a video source device, such as a DVD player, VCR, or cable or satellite receiver, may be located remotely from the television. The video source device may wirelessly transmits an audio/video signal to the television making it unnecessary to extend cables between the television and video signal or power sources. This also allows the user to position the video source in an unobtrusive place without concern for where cables must be routed. In another embodiment, a power cord may extended to the television while audio/video signal are sent wirelessly from the video source device to the television. In a further embodiment, a power cord and audio/video cables may extend to the television. The cord and cables may pass through the inside of the arms of the television support, or alternatively, the cord and cables may be attached at various points to an outside surface of the television support. Alternatively, a video source device, such as a DVD player, may be co-located with the television on the support or integrated with the television.

Additionally, it may be advantageous to allow one or more users to listen to an audio signal independently through the use of headphones. Therefore, an embodiment of the invention may provide one or more users with wireless headphones and the television may be provided with an appropriate transmitter. Alternatively, an embodiment may provide a jack for attaching headphones utilizing wires.

The invention may be practiced in ways other than those particularly described in the foregoing description and examples. Numerous modifications and variations of the invention are possible in light of the above teachings and, therefore, are within the scope of the appended claims.

The invention has been described with specific reference to particularly preferred embodiments and examples. Those skilled in the art recognize that various modifications may be made to the invention without departing from the spirit and scope thereof.

What is claimed is:

1. A support apparatus for attaching to a frame of a bed and supporting a video display for movement between a viewing position and a storage position comprising:
    a track attached to the frame of the article of furniture, the track being positioned below a mattress of the bed and extending horizontally;
    a first support arm slidably connected with the track and extending substantially vertically, the first support arm having a first end adjacent the track and a second end positioned below the track;
    a second support arm connected with the first support arm and extending substantially horizontally;
    a third support arm comprising a first section and a second section, wherein the first section is at least partially surrounded by the second section and the first section is slidably movable within the second section such that first section extends from the second section in a telescoping manner;
    a joint connecting the second arm with the third arm for movement of the third arm between a substantially horizontal position and a substantially vertical position; and
    a video display attached to the third support arm,
    wherein the third arm is in the substantially vertical position when the video display is in the viewing position, and the third arm is in the substantially horizontal position when the video display is in the storage position;
    wherein the video display rotates from a first substantially vertical position to a second substantially horizontal position adjacent the bed and below the mattress during a first storage step, and the video display traverses in a horizontal plane from the second position to a third substantially horizontal position beneath the frame of the article of furniture during a second storage step, such that the video display is positioned beneath the frame of the article of furniture when in the stored position; and
    wherein the video display is automatically moveable between the stored position and the viewing position.

2. The support apparatus of claim 1 further comprising:
    a second track attached to the bed frame ; and
    a cross member having a first end movably connected with the first track and a second end movably connected with the second track,
    wherein the first support arm is connected with the cross member.

3. The support apparatus of claim 2 wherein the second support arm is a telescoping arm.

4. The support apparatus of claim 2 further comprising:
a pivoting joint attaching the video display to the third support arm,
wherein a viewing angle of the video display is pivotal with respect to the third support arm about a axis perpendicular to the axis of the third support arm.

5. The support apparatus of claim 4 wherein the viewing angle of the video display is pivotal with respect to the third support arm about a axis parallel to the axis of the third support arm.

6. The support apparatus of claim 1 further comprising:
a fourth support arm; and
a pivoting joint attaching the video display to the fourth support arm,
wherein a viewing angle of the video display is pivotal with respect to the fourth support arm.

7. The support apparatus of claim 1 wherein the automatic movement of the video display between the stored position and the viewing position is remotely controlled.

8. The support apparatus of claim 1 further comprising a video source device, and wherein the video display comprises a power source.

9. The support apparatus of claim 8 wherein the video source device is co-located with the video display and supported by the support apparatus.

10. The support apparatus of claim 8 wherein the video source device is located remotely from the video display.

11. The support apparatus of claim 10 wherein the video source device transmits a video signal to the video display via a cable adapted to carry the video signal.

12. The support apparatus of claim 11 wherein at least a portion of the cable passes through a cavity within the third support arm.

13. The support apparatus of claim 10 further comprising:
a transmitter connected with the video source device and adapted to wirelessly transmit video signals; and
a receiver connected with the video display and adapted to receive wirelessly transmitted video signals.

14. The support apparatus of claim 8 wherein the power source comprises a cord having a first end adapted to connect with a electrical receptacle and a second end attached to the video display.

15. The support apparatus of claim 8 wherein the power source comprises a battery.

16. The support apparatus of claim 8 further comprising at least one pair of headphones adapted to receive an audio signal corresponding to the video signal from the video source device.

17. The support apparatus of claim 16 wherein the audio signal is transmitted wirelessly.

18. A support apparatus for attaching to a bed frame and supporting a video display for movement between a viewing position and a storage position comprising:
a video display;
a first track attached to a first sideboard of the bed frame;
a second track attached to a second sideboard of the bed frame;
a cross member having a first end movably connected with the first track and a second end movably connected with the second track;
a first support arm extending substantially vertically, the first support arm having a first end attached to the cross member and a second end positioned below the cross member;
a second support arm connected with the first support arm and extending substantially horizontally;
a telescoping arm attached to the video display, the telescoping arm comprising a first section and a second section, wherein the first section is at least partially surrounded by the second section, and the first section is slidably movable within the second section such that first section extends from the second section in a telescoping manner;
a joint connecting the second support arm with the telescoping arm for movement of the telescoping arm between a substantially horizontal position and a substantially vertical position;
wherein the telescoping arm is in the substantially vertical position when the video display is in the viewing position, and the telescoping arm is in the substantially horizontal position when the video display is in the storage position;
wherein the video display rotates from a first substantially vertical position to a second substantially horizontal position adjacent the bed and below a mattress of the bed during a first storage step, and the video display traverses in a horizontal plane from the second position to a third substantially horizontal position beneath the mattress during a second storage step, such that the video display is positioned beneath a mattress of the bed when in the stored position; and
wherein the video display is automatically moveable between the stored position and the viewing position.

19. A support apparatus for attaching to a bed and supporting a video display for movement between a viewing position and a storage position comprising:
a video display;
a track attached to a frame of the bed, the track being positioned below a a mattress of the bed and extending horizontally;
a first support arm slidably connected with the track and extending substantially vertically, the first support arm having a first end adjacent the track and a second end positioned below the track;
a second support arm rotatable about an axis of the first support arm and extending substantially horizontally;
a telescoping arm attached to the video display, the telescoping arm comprising a first section and a second section, wherein the first section is at least partially surrounded by the second section, and the first section is slidably movable within the second section such that first section extends from the second section in a telescoping manner;
a joint connecting the second support arm with the telescoping arm for movement of the telescoping arm between a substantially horizontal position and a substantially vertical position; and
wherein the telescoping arm is in the substantially vertical position when the video display is in the viewing position, and the telescoping arm is in the substantially horizontal position when the video display is in the storage position;
wherein the video display rotates from a first substantially vertical position to a second substantially horizontal position adjacent the bed and below the mattress during a first storage step, and the video display traverses in a horizontal plane from the second position to a third substantially horizontal position beneath the mattress during a second storage step, such that the video display is positioned beneath the mattress when in the stored position; and
wherein the video display is automatically moveable between the stored position and the viewing position.

* * * * *